(12) United States Patent
Okada et al.

(10) Patent No.: US 8,348,639 B2
(45) Date of Patent: Jan. 8, 2013

(54) SEALING DEVICE (75) Inventors: Masatoshi Okada, Mito (JP); Iwao Taira, Nihonmatsu (JP); Tadashi Abiko, Nihonmatsu (JP); Yosuke Kondo, Nihonmatsu (JP); Kazuki Takeno, Fukushima (JP); Ichiro Yamane, Fukushima (JP)

(73) Assignee: NOK Corporation, Tokyo (JP)

( * ) Notice: Subject to any disclaimer, the term of this patent is extended or adjusted under 35 U.S.C. 154(b) by 819 days.

(21) Appl. No.: 11/727,763

(22) Filed: Mar. 28, 2007

(65) Prior Publication Data

US 2007/0169621 A1  Jul. 26, 2007

Related U.S. Application Data (62) Division of application No. 10/479,417, filed on Apr. 13, 2004, now abandoned.

(30) Foreign Application Priority Data

Jun. 4, 2001 (JP) ................................ 2001-168747
May 15, 2002 (JP) ................................ 2002-140744

(51) Int. Cl.
*F04B 35/04* (2006.01)
(52) U.S. Cl. ................................. 417/423.11
(58) Field of Classification Search ................. 417/539, 417/423.9, 423.11, 423.14, 439; 277/566, 277/591, 436–439, 510, 530, 908; 123/495; 92/168
See application file for complete search history.

(56) References Cited

U.S. PATENT DOCUMENTS

| 2,905,489 A | 9/1959 | Thompson |
| 2,935,365 A | 5/1960 | Dega ............................ 277/468 |
| 3,214,182 A | 10/1965 | Herbruggen |
| 3,268,235 A | 8/1966 | Jacobellis ..................... 277/468 |
| 3,272,520 A | 9/1966 | Woolfenden .................. 277/589 |
| 3,351,350 A | 11/1967 | Shepler |
| 3,540,741 A | 11/1970 | Lefebvre ....................... 277/589 |
| 3,584,884 A | 6/1971 | Fuchs, Jr. ...................... 277/500 |

(Continued)

FOREIGN PATENT DOCUMENTS

DE  4027486  4/1991
(Continued)

OTHER PUBLICATIONS

Korean Official Action dated Mar. 13, 2008.
(Continued)

*Primary Examiner* — Devon Kramer
*Assistant Examiner* — Amene Bayou
(74) *Attorney, Agent, or Firm* — Jacobson Holman PLLC (57) ABSTRACT

A high performance sealing device having an excellent pressure resistance and realizing a prevention of damage. The sealing device usable at a working pressure of 0 to 2 MPa, and not damaged even if the pressure of high-pressure fuel of 5 MPa or higher is applied thereto, wherein high pressure fuel on the high pressure side is sealed by a first seal part, oil from a cam side on a low pressure side is sealed by a second seal part, and the fuel slightly leaked due to failure of scraping at the first seal part is sealed by the second seal part to form a dual seal structure. A resin ring coming into slidable sealing contact with a shaft is used in the first seal part, whereby abnormal abrasion does not occur even when fuel having less lubricity is used, and the durability of the seal is increased.

5 Claims, 9 Drawing Sheets

U.S. PATENT DOCUMENTS

| | | | | |
|---|---|---|---|---|
| 3,636,824 A | | 1/1972 | Clark | 92/249 |
| 3,774,919 A | | 11/1973 | Kreuzer | 277/589 |
| 3,885,800 A | | 5/1975 | Sievenpiper | 277/468 |
| 3,909,016 A | * | 9/1975 | Traub et al. | 277/589 |
| 3,921,991 A | | 11/1975 | Beck | |
| 3,942,806 A | * | 3/1976 | Edlund | 277/589 |
| 3,958,903 A | | 5/1976 | Capelli | |
| 4,020,910 A | * | 5/1977 | Peterson et al. | 175/345 |
| 4,060,023 A | * | 11/1977 | Vegella | 92/168 |
| 4,541,638 A | * | 9/1985 | Ogawa et al. | 277/402 |
| 4,729,569 A | * | 3/1988 | Muller et al. | 277/584 |
| 5,098,071 A | | 3/1992 | Umetsu | |
| 5,797,594 A | | 8/1998 | Sekine | |
| 5,901,686 A | * | 5/1999 | Stockner et al. | 123/495 |
| 5,992,768 A | * | 11/1999 | Beatty et al. | 239/533.9 |
| 6,142,476 A | * | 11/2000 | Iwane | 277/358 |
| 6,290,235 B1 | * | 9/2001 | Albertson | 277/510 |
| 6,547,250 B1 | * | 4/2003 | Noble et al. | 277/309 |
| 2004/0188949 A1 | | 9/2004 | Foote | |

FOREIGN PATENT DOCUMENTS

| | | | |
|---|---|---|---|
| DE | 19629501 | | 1/1997 |
| EP | 0353703 | | 2/1990 |
| JP | 54-67154 | | 5/1979 |
| JP | 62183165 A | * | 8/1987 |
| JP | 62-183165 | | 11/1987 |
| JP | 1-91163 | | 6/1989 |
| JP | 1-98968 | | 7/1989 |
| JP | 5-69200 | | 3/1993 |
| JP | 6-24270 | | 3/1994 |
| JP | 6-63965 | | 9/1994 |
| JP | 11-248003 | | 9/1999 |

OTHER PUBLICATIONS

Office Action issued on Jun. 25, 2010 from United States Patent Office in corresponding U.S. Appl. No. 12/078,508.

* cited by examiner

PRIOR ART

SEALING DEVICE

This is a divisional application of application Ser. No. 10/479,417, filed Apr. 13, 2004 now abandoned.

TECHNICAL FIELD

The present invention relates to a sealing device to be used, for example, as seal for reciprocating movement for a high-pressure fuel pump for pressurizing fuel to a high-pressure.

BACKGROUND ART

In recent years, in diesel engines or in gasoline engines, those of in-cylinder direct injection system in which fuel at high pressure is directly injected in a cylinder for combustion have been developed for improved performance such as fuel-efficient, high output, and so on.

In such an engine of in-cylinder direct injection system requires a high-pressure fuel pump for pressurizing fuel to a high pressure, and such high-pressure fuel pump is provided with a sealing device for reciprocating movement in which high sealing property is required.

Figure 9:
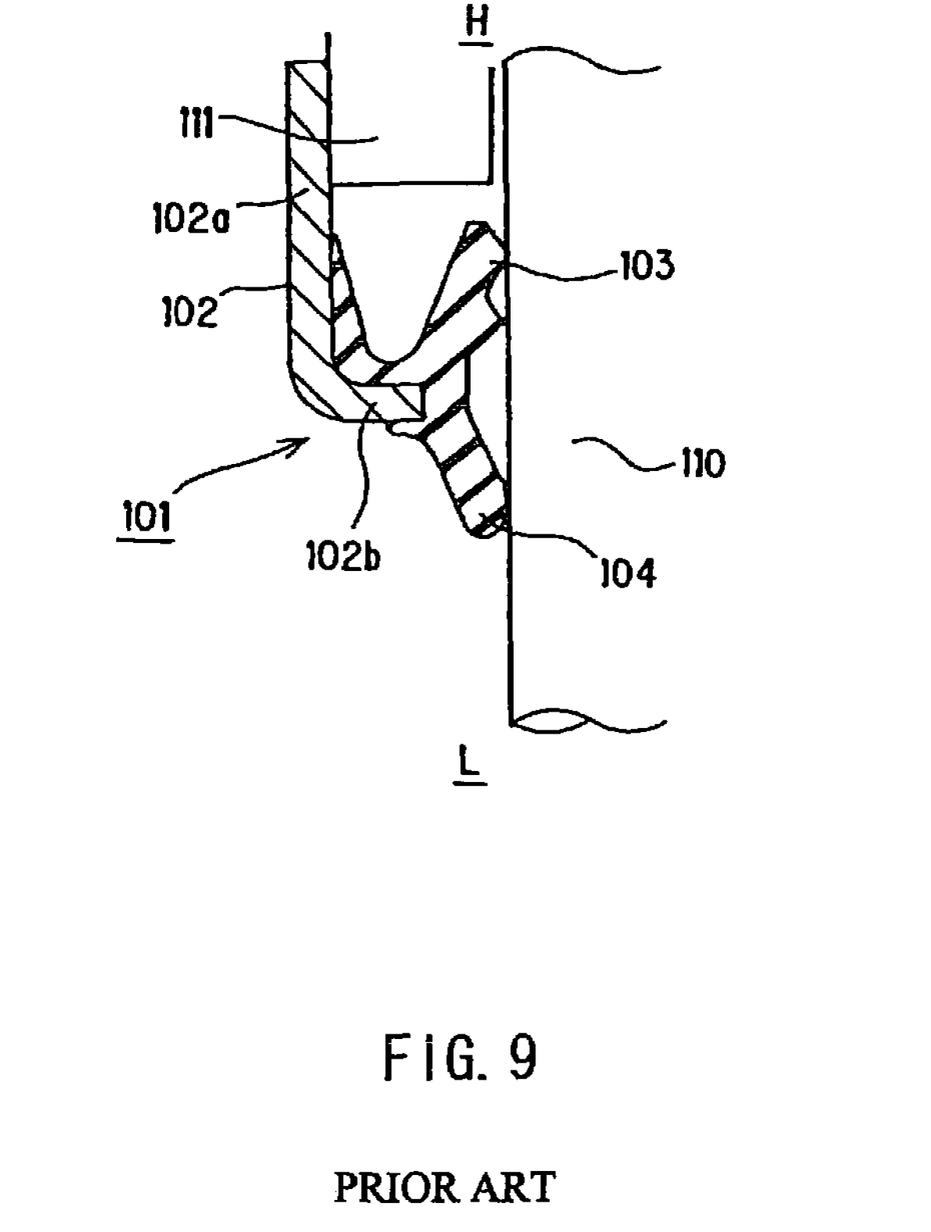
FIG. 9 is a half cross-sectional view showing a sealing device according to the related art.

One of sealing devices for reciprocating movement in the related art is shown in FIG. 9. A sealing device 101 shown in FIG. 9 is employed for the purpose of sealing high-pressure fuel supplied from a high-pressure fuel pump used for an engine, which performs fuel injection, to the high-pressure side H, which is the side to be sealed, of a shaft 110 reciprocating in the axial direction.

In FIG. 9, the sealing device 101 is disposed at the end of a housing 111, so as to seal high-pressure fuel (gasoline, light oil, and so on), which is an object to be sealed, flown from the high-pressure side H and passed through a sliding portion of a shaft guiding portion of the housing 111. Also, sealed on the low-pressure side L of the sealing device 101 is oil intended for lubrication and cooling.

In addition, the sealing device 101 includes a metal ring 102 having a cylindrical portion 102a to be fitted on the outer periphery of an end of the housing 111, and a first and a second seal lips 103, 104 formed of rubber-like resilient body, each extending from an inwardly directed flange section 102b provided at the end of the low-pressure side L of the cylindrical portion 102a of the metal ring 102 toward the high-pressure side H and the low-pressure side L for sliding on the shaft 110.

However, in the sealing device in the related art shown in FIG. 9, in order to prevent fuel leakage due to excessive abrasion of the seal lip, damage of the rubber-like resilient body, and so on, which may be caused by increase in the pressure of the high-pressure fuel, it has been necessary to construct the pump in such a manner that the pressure of the high-pressure fuel relating to the sealing device is limited normally to 0 to 0.6 MPa.

Therefore, the rubber-like resilient body is thin and when it is subjected to the pressure of the high-pressure fuel of 1 MPa or higher, it may be broken abruptly upon operation.

Since the used fuel has no lubricity, the more the pressure of the high-pressure fuel increases, the more the seal lip is abraded in an abnormal manner, and thus fuel leakage is more likely to occur.

In the case of fuel containing alcohol, the rubber-like resilient body is swelled, and thus is lowered in hardness and strength, whereby abrupt breakage upon operation, or fuel leakage due to decrease of tightening margin of the seal lip may occur.

In addition, since the device is bulky, space saving could not be achieved.

On the other hand, elimination of a drain port is contemplated for simplifying the pump construction. However, since elimination of the drain port may increase the pressure of the high-pressure fuel, it cannot be eliminated for limiting the working pressure of the high-pressure fuel to 0-0.6 MPa, and hence simplification of the pump construction cannot be achieved.

In view of such problems in the related art as described above, it is an object of the present invention to provide a high-performance sealing device which is superior in pressure-resistance, and thus can realize prevention of breakage.

DISCLOSURE OF INVENTION

In order to achieve the object described above, the present invention is a sealing device for sealing an annular gap formed between two opposing reciprocating surfaces, characterized by including a first sealing part having a resin sealing member coming into slidable sealing contact with one of the opposed surfaces and an urging member for urging the resin sealing member toward the one of the opposed surfaces, and a second sealing part disposed on the side of the first sealing part opposite from the side to be sealed.

Therefore, dual-sealing structure in which slight leakage due to failure of scraping at the first sealing part is sealed by the second sealing part is realized, and thus it can be used at the working pressure of 0-2 MPa, and moreover, it is prevented from breaking even when being subjected to the pressure of the high-pressure fuel at 5 MPa or higher.

Also, since a resin sealing member, which comes into slidable sealing contact with the one of the opposed surfaces, is used in the first sealing part, even when fuel having less lubricity is used, abnormal abrasion is prevented and thus durability of the seal is improved.

In addition, even when a fuel containing alcohol is used, swelling hardly occurs at the first sealing part since the sealing member used is made of resin, and the urging member is prevented from breaking since there is no thinner portion unlike in the sealing device in the conventional art and, furthermore, leakage due to decrease of tightening margin hardly occurs.

Still furthermore, the first and the second sealing parts are simple in construction, and thus may be downsized and designed for space-saving in comparison with the construction of the sealing device having the seal lip as in the conventional art.

Then, since it can be used even when the working pressure of the high-pressure fuel is as high as 0-2 MPa, the drain port can be eliminated and thus simplification of the pump construction is achieved.

Preferably, the first sealing part includes a seal retaining member forming a side wall of a groove on the side of the mounting groove for accommodating the first sealing part fitted therein opposite from the side to be sealed, and the seal retaining member is formed with a second mounting groove for accommodating the second sealing part.

Accordingly, a seal of dual-sealing construction is formed with a simple construction.

Preferably, the second sealing part is a squeeze packing.

Accordingly, improvement of sealing property is achieved.

Preferably, the second sealing part includes a resin sealing member which comes into slidable sealing contact with one of the opposed surfaces and an urging member for urging the resin sealing member toward the one of the opposed surfaces.

Accordingly, usage of the device under higher pressure is realized.

Preferably, the second sealing part is a packing having a back-pressure leaking capability.

Accordingly, even when the pressure is accumulated between the first sealing part and the second sealing part, the accumulated pressure can be released through the packing having the back-pressure leaking capability of the second sealing part, thereby the durability can be improved.

Preferably, the second sealing part is a sealing member having a seal lip portion which comes into slidable sealing contact with the one of the opposed surfaces.

Accordingly, the sealing property of the device can further be improved.

BEST MODE FOR CARRYING OUT THE INVENTION

Referring now to the drawings, preferred embodiments of the present invention will be described in detail. However, dimensions, materials, configurations, and the relative positions thereof stated in these embodiments are not limited thereto unless otherwise specifically noted.

(First Embodiment)

Figure 1:
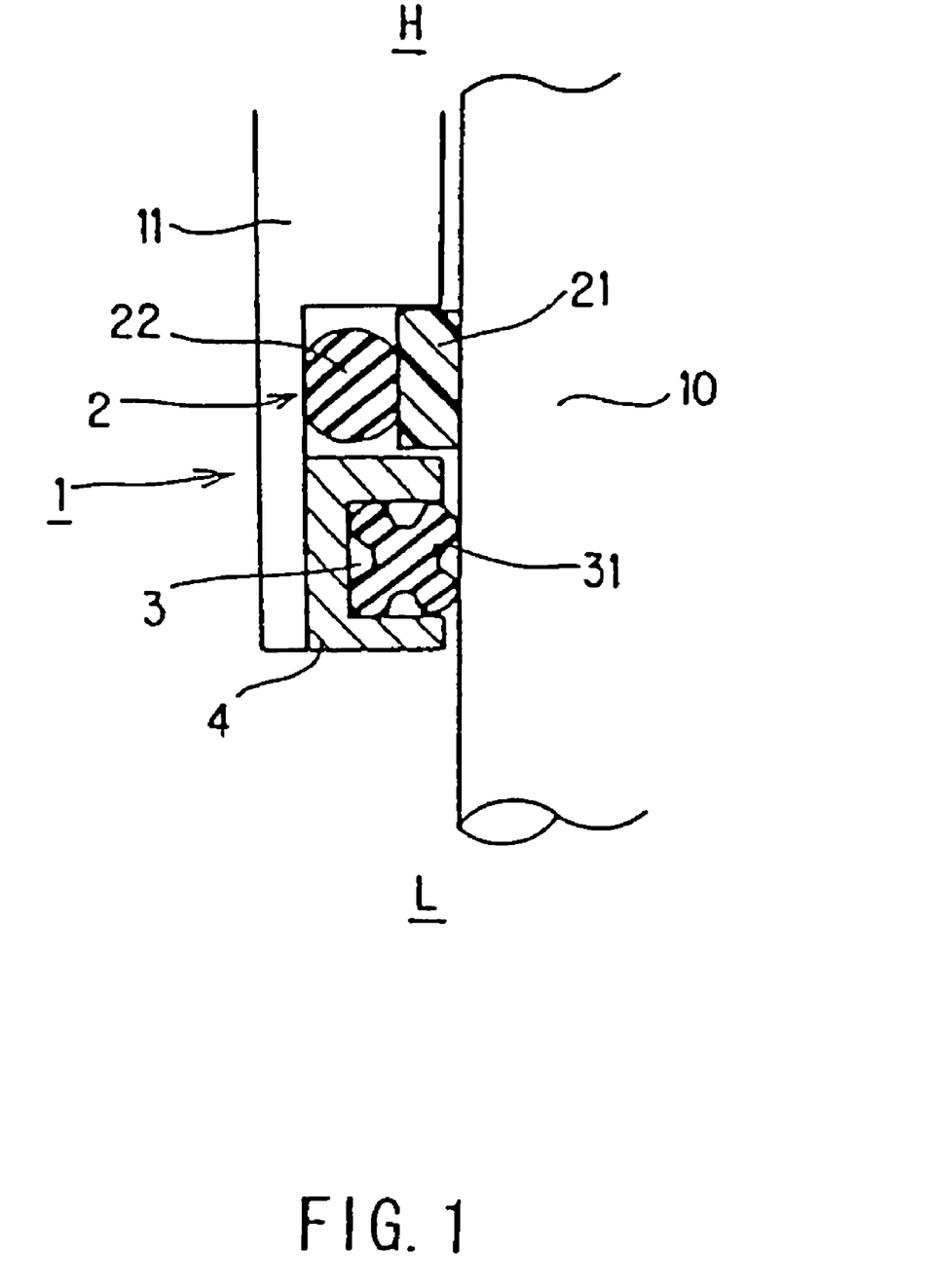
FIG. 1 is a drawing showing a sealing device according to a first embodiment.
Figure 2:
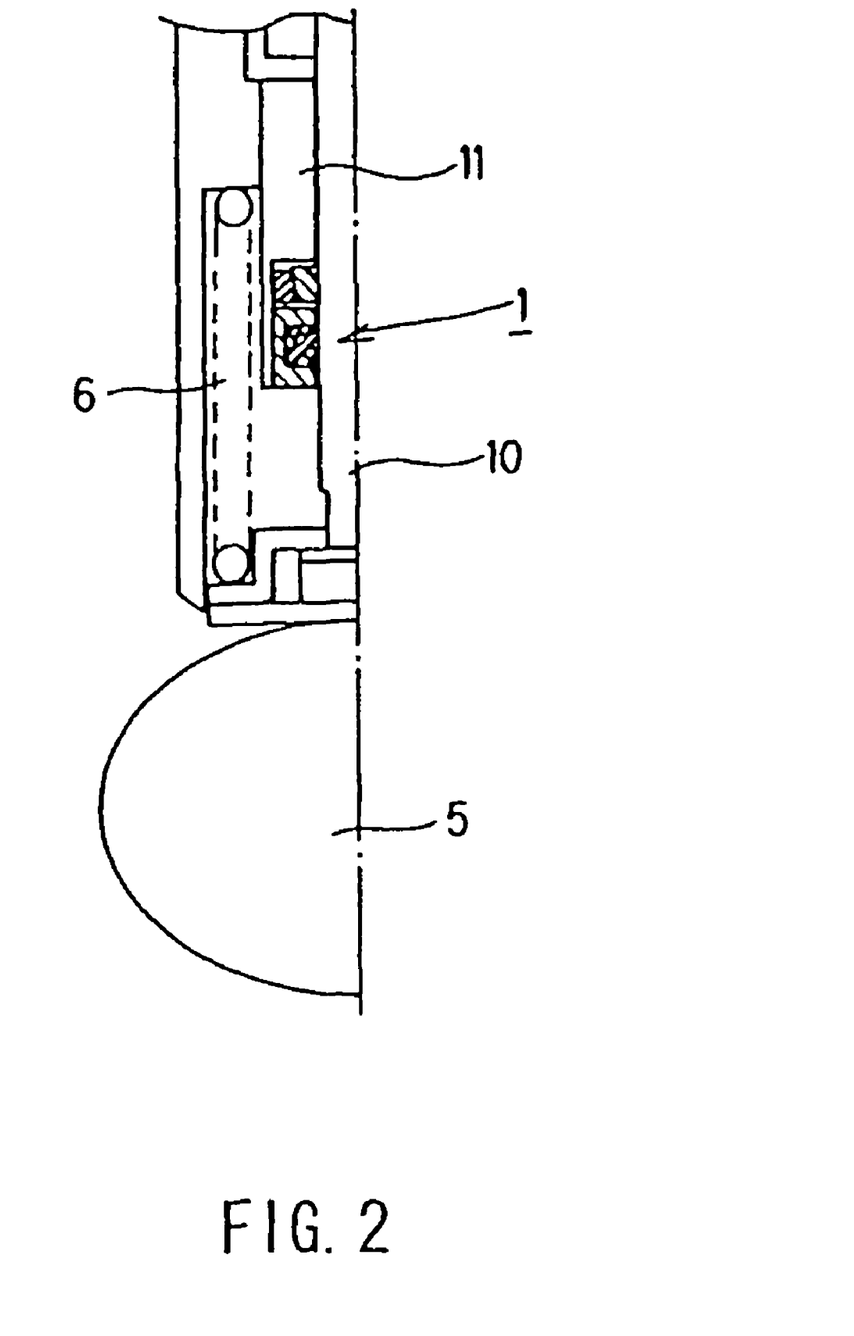
FIG. 2 is a half cross-sectional view showing a peripheral system to which the sealing device according to the first embodiment is applied.

FIG. 1 shows a sealing device 1 according to a first embodiment, and FIG. 2 shows a peripheral system to which the sealing device 1 in FIG. 1 is applied.

The sealing device 1 in FIG. 1 is used as a sealing device for reciprocating movement, which requires a high sealing property, to be used in a high-pressure fuel pump for pressurizing fuel to a high pressure in an engine of in-cylinder direct injection system that high-pressure fuel is directly injected in a cylinder for combustion, and is employed for seal the high-pressure fuel supplied on the high-pressure side H, which is to be sealed with respect to a axially reciprocating shaft 10.

In FIG. 1, the sealing device 1 is attached at the end of a housing 11 for sealing a high-pressure fuel (gasoline, light oil, and so on), which is to be sealed, supplied from the high-pressure side H from passing a sliding portion of a shaft guiding portion of the housing 11. Besides, on the low-pressure side L of the sealing device 1, oil for lubrication and cooling is sealed.

The sealing device 1 includes a first sealing part 2 and a second sealing part 3 arranged in this order from the high-pressure side H at the end portion of the housing 11 having an enlarged inner diameter.

A mounting groove for accommodating the first sealing part 2 fitted therein is formed in such a manner that a shoulder portion formed by enlarging the inner diameter at the end of the housing 11 is defined as a sidewall of a groove on the high-pressure side, and a seal retainer 4 which serves as seal retaining member is disposed on the low-pressure side L.

The first sealing part 2 to be fitted in the mounting groove includes a resin ring 21, which is a sealing member formed of resin, coming into slidable sealing contact with the shaft 10, and an O-ring 22, which is an urging member for urging the resin ring 21 toward the shaft 10.

The resin ring 21 of the first sealing part 2 is annular shape having a rectangular cross-section, and is formed of a resin material of tetrafluoroethylene group. Using such material contributes to achieve properties superior in fuel resistance, heat resistance, abrasion proof, and slidability. The inner peripheral surface of the resin ring 21 defines a sliding surface which comes into abutment with/slides over the shaft 10.

The O-ring 22 is formed of rubber-like resilient body disposed on the backside, the side of the housing 11 (on the bottom side of the groove), of the resin ring 21. The resin ring 21 is urged toward the shaft 10 by an urging force generated as a reaction of the O-ring 22 when being crushed in the radial direction. The O-ring 22 is formed of fluorinated rubber, acrylic rubber, or the like. Using such material contributes to achieve properties superior in fuel resistance and heat resistance. Preferably, fluorinated rubber, which is superior also in low temperature resistance (For example, Viton GLT from Dupont), is used.

On the other hand, the seal retainer 4 forming a side wall of a groove on the low-pressure side of the mounting groove for accommodating the first sealing part 2 fitted therein is a ring-shaped member formed of metal or the like to be fitted in the inner periphery at the end of the housing 11 of enlarged diameter. A second mounting groove for fitting the second sealing part 3 is formed on the inner periphery of the seal retainer 4.

In the second mounting groove of the seal retainer 4, the second sealing part 3 is fitted so that sealing on the low-pressure side L is achieved by being abutted to and sliding on the shaft 10.

The second sealing part 3 uses an X-ring 31, which is a squeeze packing. Incidentally, the squeeze packing used in the second sealing part 3 may be an O-ring, a D-ring, and the like. Material of the squeeze packing is fluorinated rubber or acrylic rubber which is superior in fuel resistance and heat resistance. Preferably, fluorinated rubber is used.

The sealing device 1 thus constructed is applied to a system as shown in FIG. 2. That is, in FIG. 2, the shaft 10 moves reciprocally by the rotation of a cam 5 connected directly to the engine, and increases the pressure of the high-pressure fuel on the high-pressure side H. The spring 6 keeps the shaft 10 constantly in contact with the cam 5 so that the operation of the cam 5 is connected directly to the shaft.

Here by setting the distance between the first sealing part 2 and the second sealing part 3 longer than the reciprocating stroke of the shaft 10, entry of a fluid to be sealed in the first sealing part 2 into the second sealing part can be prevented. On the other hand, by setting the distance between two lips of the X-ring 31 which come into contact with the shaft 10 shorter than the reciprocating stroke of the shaft 10, lubricating oil spreads over both lips, and thus lubricity is maintained and abrasion of the lips is reduced, whereby the life of the lips can be increased.

The sealing device 1 in this arrangement has a dual-sealing construction in which the high-pressure fuel on the high-pressure side H is sealed by the first sealing part 2, oil such as engine oil coming from the cam 5 side on the low-pressure side L is sealed by the second sealing part 3, and slight leakage of the high-pressure fuel due to failure of scraping at the first sealing part 2 can be sealed at the second sealing part 3.

Therefore, the sealing device 1 according to the present embodiment can be used at the working pressure of 0-2 MPa and is prevented from breaking even when being subjected to the pressure of the high-pressure fuel at 5 MPa or higher.

In addition, since the resin ring 21 which comes into slidable sealing contact with the shaft 10 is used in the first sealing part 2, even when fuel having less lubricity is used, abnormal abrasion is prevented and thus durability of the seal is improved.

Furthermore, since the resin ring 21 is used at the first sealing part 2, swelling hardly occurs even when a fuel containing alcohol is used. The O-ring 22 is prevented from breaking since there is not thinner portion unlike in the sealing device in the conventional art and leakage due to decrease of tightening margin hardly occurs.

Still furthermore, the first and the second sealing part 2, 3 are simple in construction, and thus may be downsized and designed for space-saving in comparison with the construction of the sealing device having the seal lip as in the conventional art.

In addition, since it can be used even when the working pressure of the high-pressure fuel is as high as 0-2 MPa, the drain port can be eliminated and thus simplification of the pump construction is achieved.

Figure 3:
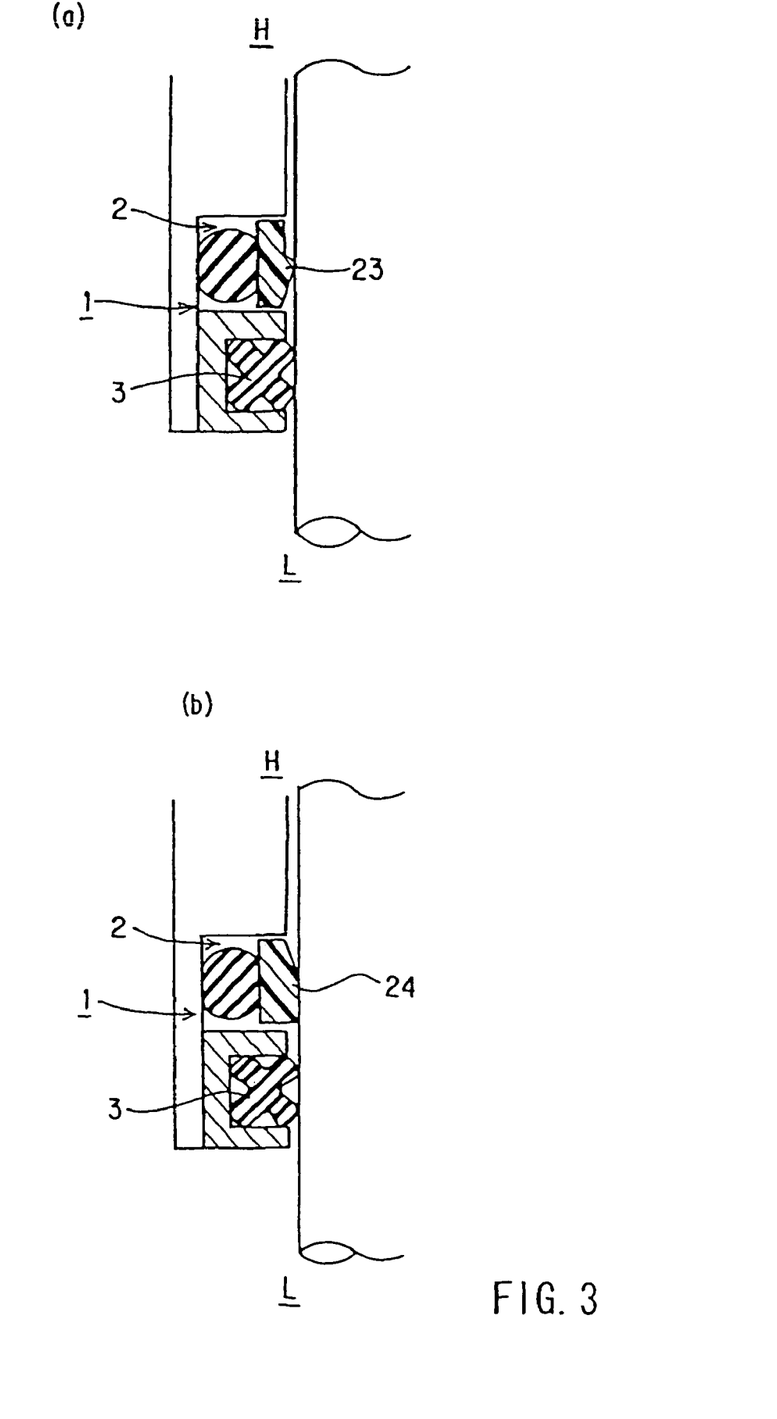
FIG. 3 is a drawing showing another example of the sealing device according to the first embodiment.

Incidentally, in this embodiment, the resin ring 21 of the first sealing part 2 is a rectangle in cross section. However, it is not limited thereto, and resin rings 23, 24 having cross sections shown in FIG. 3 may be employed. The resin ring 23 shown in FIG. 3(a) has a tapered surface on the low-pressure side L with the axial center of the sliding surface projected. The resin ring 24 shown in FIG. 3(b) has a tapered surface on the sliding surface on the high-pressure side H so as to deviate from the shaft as it get close to the high-pressure side. Accordingly, distribution of the sealing surface pressure seals the fluid to be sealed on the high-pressure side H, and the pressure accumulated between the first sealing part 2 and the second sealing part 3 can be discharged toward the high-pressure side H.

Moreover, mounting the sealing device can be performed easily by firstly pressing the resin ring 21 and the O-ring 22 which constitute the first sealing part 2 to the side wall of a groove of the mounting groove on the high-pressure side, and then fitting the seal retainer 4 to the housing 11 with the X-ring 31 which constitutes the second sealing part 3 fitted in the seal retainer 4.

(Second Embodiment)

Figure 4:
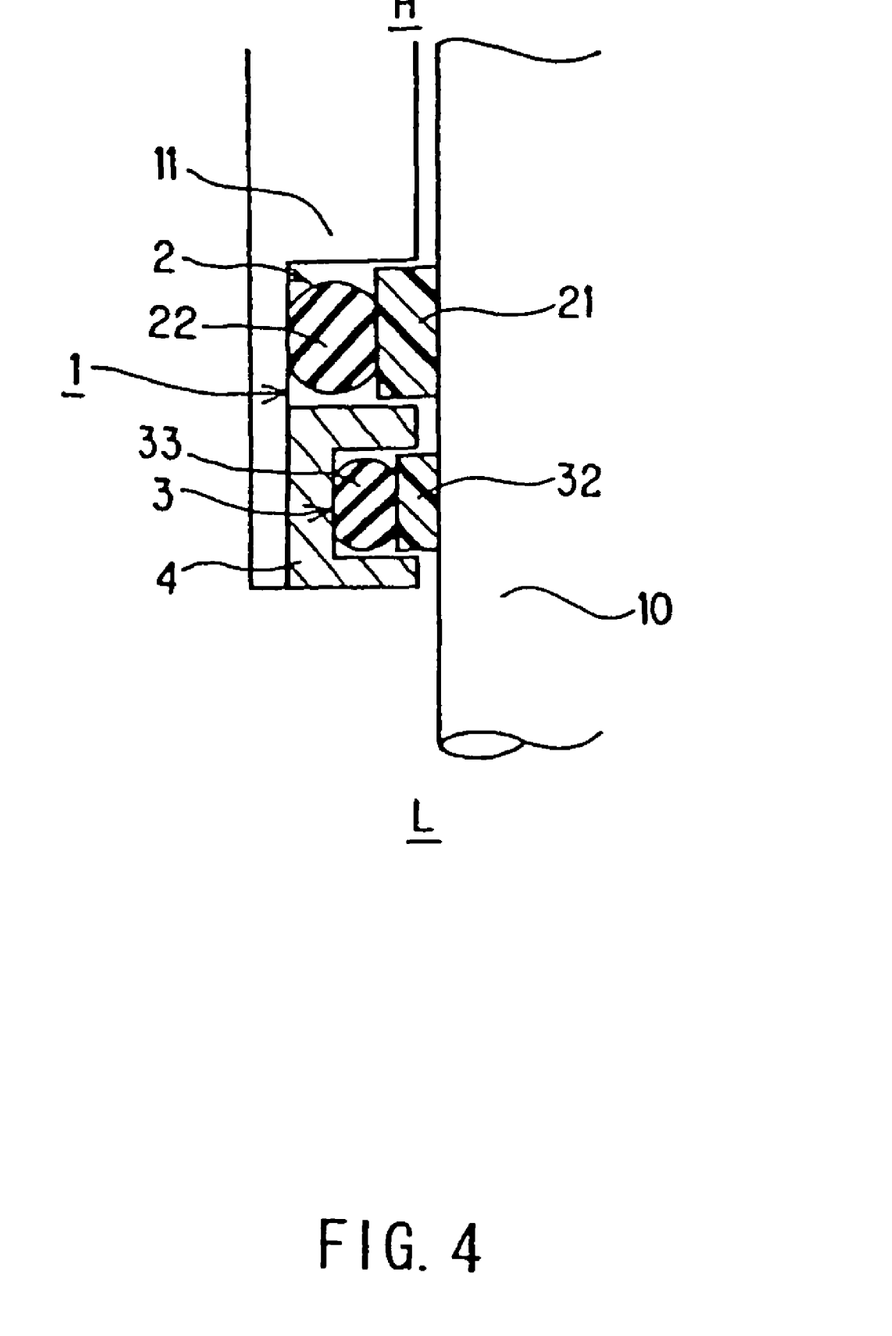
FIG. 4 is a drawing showing the sealing device according to the second embodiment.

FIG. 4 is a half cross-sectional view showing the sealing device 1 according to the second embodiment. Incidentally, since the configuration, material and the like of each member are the same as those in the first embodiment, description will be omitted.

In the sealing device 1 shown in FIG. 4, the second sealing part 3 includes a second resin ring 32 that comes into slidable sealing contact with the shaft 10 which is similar to the first sealing part 2, and a second O-ring 33 for urging the second resin ring 32 toward the shaft 10.

In this arrangement as well, the same effects as the first embodiment is achieved. Moreover, with the second sealing part 3 of this construction, durability against the high-pressure increases and thus usage of the device under higher pressure is realized.

(Third Embodiment)

Figure 5:
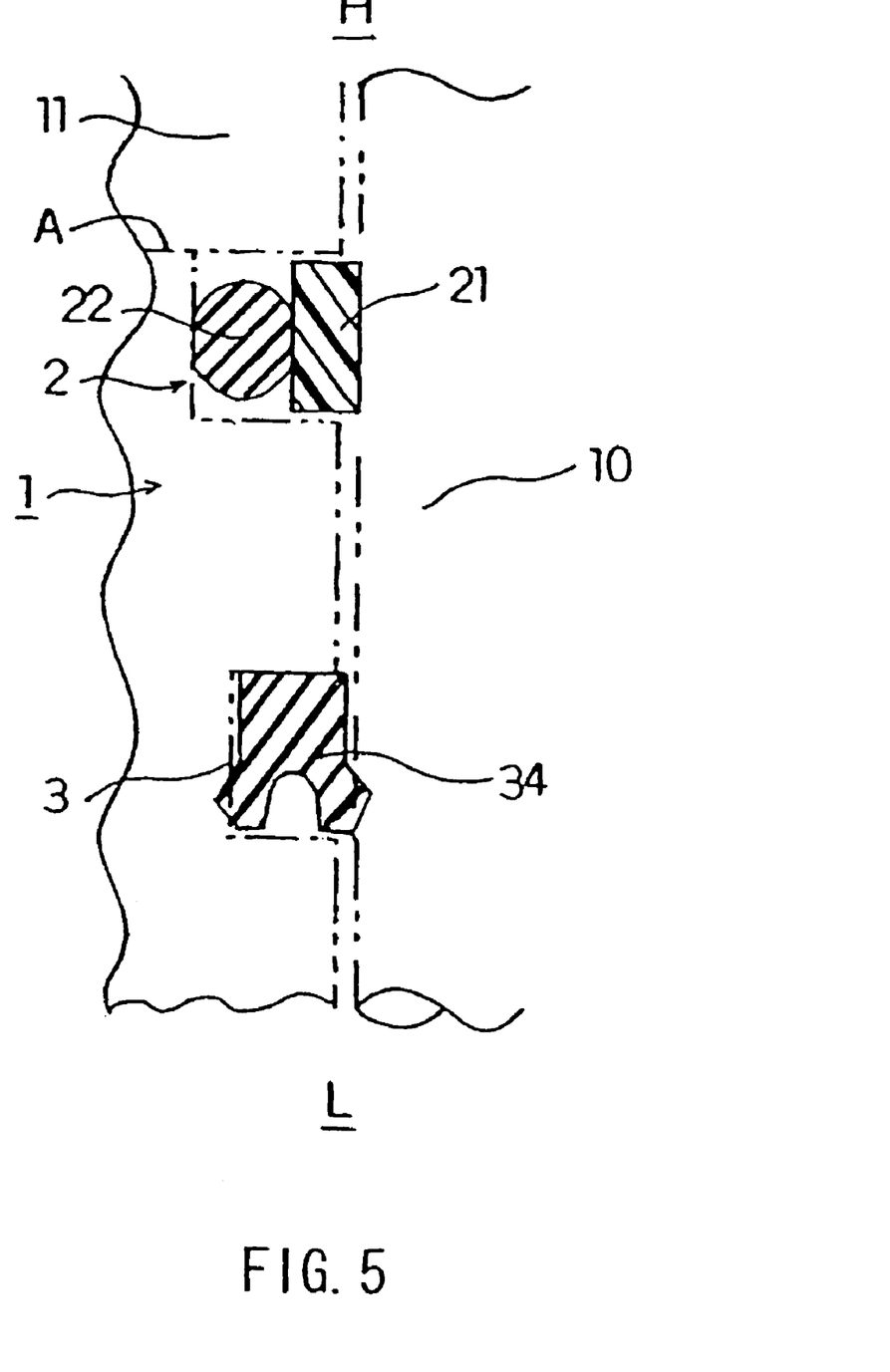
FIG. 5 is a drawing showing the sealing device according to the third embodiment.

FIG. 5 is a half cross section showing the sealing device 1 according to the third embodiment. Incidentally, since the configuration, material, and the like are the same as those in the first embodiment other than that the seal retainer 4 is not used, description will be omitted.

In the sealing device 1 shown in FIG. 5, a U-packing 34 is used as a packing having a back-pressure leaking capability for the second sealing part 3. The packing having the back-pressure leaking capability used for the second sealing part 3 is not limited to the U-packing 34, and other types of packing may be used. Material to be used for this packing is fluorinated rubber or acrylic rubber, which are superior in fuel resistance and heat resistance. Preferably, fluorinated rubber is used.

In the construction described above as well, the same effects as in the first embodiment are achieved. Also, even when the pressure is accumulated between the first sealing part 2 and the second sealing part 3, the accumulated pressure may be released toward the low-pressure side L from the U-packing 34 of the second sealing part 3, thereby durability can be improved.

Here, the mounting groove for accommodating the first sealing part 2 fitted therein in this embodiment is divided at the portion indicated by a line A. Therefore, it is possible to divide the housing 11 at the portion of line A for fitting the resin ring 21 and the O-ring 22 of the first sealing part 2. The resin ring 21, which can hardly be deformed, and the O-ring 22 can be attached easily.

In addition, according to the present embodiment, the distance between the positions where the first sealing part 2 and the second sealing part 3 are disposed is set longer than the reciprocating stroke of the shaft 10, and thus fuel can hardly reach the second sealing part 3, thereby entrance of fuel into the second sealing part 3 is prevented.

(Fourth Embodiment)

Figure 6:
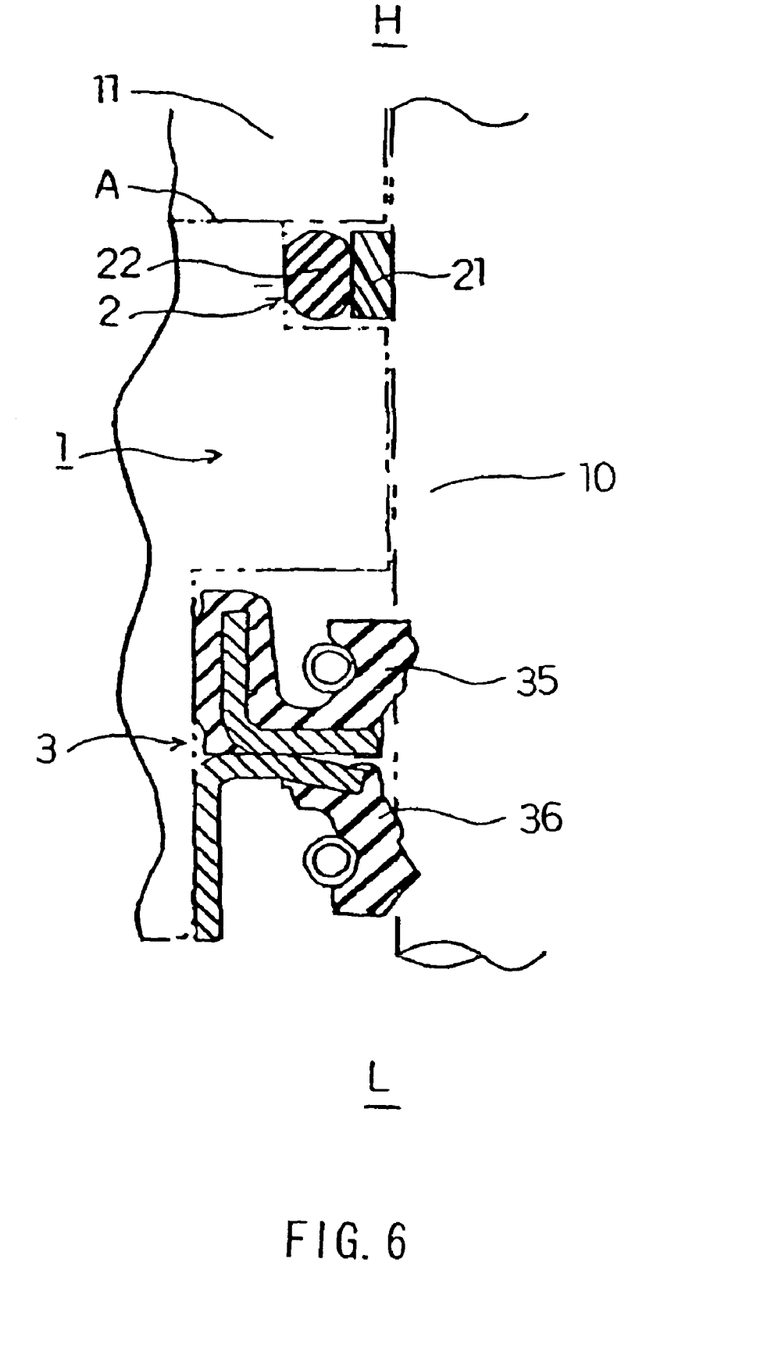
FIG. 6 is a drawing showing the sealing device according to the fourth embodiment.

FIG. 6 is a half cross-sectional view showing the sealing device 1 according to the fourth embodiment. Incidentally, since the configuration, material, and the like are the same as those in the third embodiment, description will be omitted.

In the sealing device 1 shown in FIG. 6, the second sealing part 3 includes oil seals 35, 36 as sealing members each having a seal lip portion. The oil seal 35 is disposed on the high-pressure side H and the oil seal 36 is disposed on the low-pressure side L.

The oil seals 35, 36 are both constructed by attaching a rubber-like resilient body on a metal ring by baking. Material of the rubber-like resilient body used is fluorinated rubber or acrylic rubber which is superior in fuel resistance and heat resistance for the both oil seals 35, 36. Preferably, fluorinated rubber is used. Also, the tip of the inner diameter of the metal ring of the oil seal 35 on which the seal lip portion is attached by baking is set as small as possible, so as to prevent deformation of the seal lip portion and the pressure resistance is improved.

The seal lip portions of the respective oil seals 35, 36 are pressed against the surface of the shaft 10 by a garter spring.

The distance between the tips of seal lip portions of the oil seals 35, 36 is set shorter than the reciprocating stroke of the shaft 10, and thus lubricating oil spreads over the both oil seals 35, 36.

Here, the seal lip portion of the oil seal 35 extends toward the high-pressure side H. It is for sealing leakage of fuel on the high-pressure side H sufficiently by the oil seal 35. The seal lip portion of the oil seal 35, which comes into contact with the surface of the shaft 10, is arcuate shape at the tip thereof. The arcuate shape can lower the sliding resistance with respect to the surface of the shaft 10, so that abrasion is prevented even when sliding especially with fuel, and leakage of oil supplied from the low-pressure side L via the surface of the shaft 10 due to failure of scraping is prevented.

In addition, the seal lip portion of the oil seal 36 extends toward the low-pressure side L. It is for sealing leakage of oil on the low-pressure side L.

Here, the oil seal 35 is covered at the fitting portion with the rubber-like resilient body to achieve rubber fitting for preventing leakage. Also, the oil seal 36 is constructed at the fitting portion of only the metal ring to achieve metal fitting for fixing the oil seals 35, 36.

In the construction described above, the same effects as the first embodiment are achieved. Moreover, since the oil seals 35, 36 having the seal lip portions for the second sealing part 3 are used, sealing property of the device is further improved.

In this embodiment as well, the mounting groove for accommodating the first sealing part 2 fitted therein can be divided at the portion indicated by the line A as in the case of the third embodiment. Also, the distance between the positions where the first sealing part 2 and the second sealing part 3 are disposed is set longer than the reciprocating stroke of the shaft 10. The effect thereof is as described in conjunction with the third embodiment.

(Fifth Embodiment)

Figure 7:
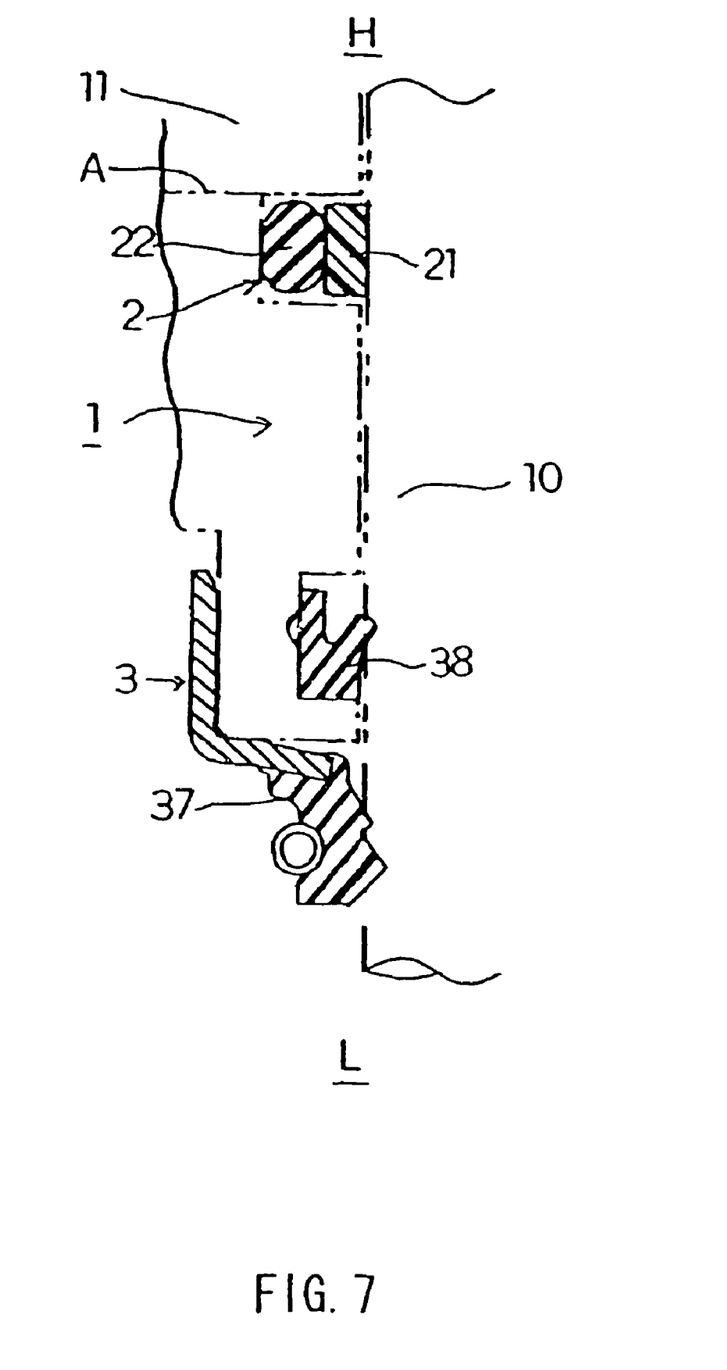
FIG. 7 is a drawing showing the sealing device according to the fifth embodiment.

FIG. 7 is a half cross-sectional view showing the sealing device 1 according to the fifth embodiment. Incidentally, since the configuration, material and the like of each member are the same as those in the third embodiment, description will be omitted.

The sealing device 1 in FIG. 7 employs an oil seal 37 as a sealing member having a seal lip portion for the second sealing part 3. In addition, a sub packing 38 as auxiliary sealing member is disposed on the high-pressure side H of the oil seal 37.

The oil seal 37 is constructed by attaching a rubber-like resilient body on a metal ring by baking. Material to be used for the rubber-like resilient body is fluorinated rubber or acrylic rubber, which are superior in fuel resistance and heat resistance. Preferably, fluorinated rubber is used. The oil seal 37 is mounted using the metal ring fitted around the outer periphery of the housing 11.

The seal lip portion of the oil seal 37 is pressed against the surface of the shaft 10 by a garter spring.

The seal lip portion of the oil seal 37 extends toward the low-pressure side L. It is for sealing leakage of oil on the low-pressure side L by the oil seal 37.

The sub packing 38 is a U-packing or the like disposed in a square mounting groove on the high-pressure side H with respect to the oil seal 37, and the outer peripheral surface of the packing is provided with a projection for increasing the surface pressure and thus improving the sealing property. The inner peripheral surface of the sub packing 38 can sufficiently seal leakage of fuel on the high-pressure side H by sliding on the shaft 10. Furthermore, since the housing 11 is positioned as close to the shaft 10 as possible on the low-pressure side L, the sub packing 38 is prevented from being deformed and thus pressure resistance is improved. The same material as the rubber-like resilient body of the oil seal 37 is used for the sub packing 38 as well.

In the construction described above as well, the same effects as in the first embodiment are achieved. Moreover, since the oil seal 37 and the sub packing 38 having the seal lip portions are used for the second seal part 3, further improvement of the sealing property of the device is achieved. In addition, since the compact oil seal 37 is used, the axial dimension of the device may be reduced.

Incidentally, in this embodiment as well, the mounting groove for accommodating the first sealing part 2 fitted therein may be divided at the portion indicated by the line A as in the case of the third embodiment. Also, the distance between the positions where the first sealing part 2 and the second sealing part 3 are disposed is set longer than the reciprocating stroke of the shaft 10. The effects thereof are the same as described in conjunction with the third embodiment.

(Sixth Embodiment)

Figure 8:
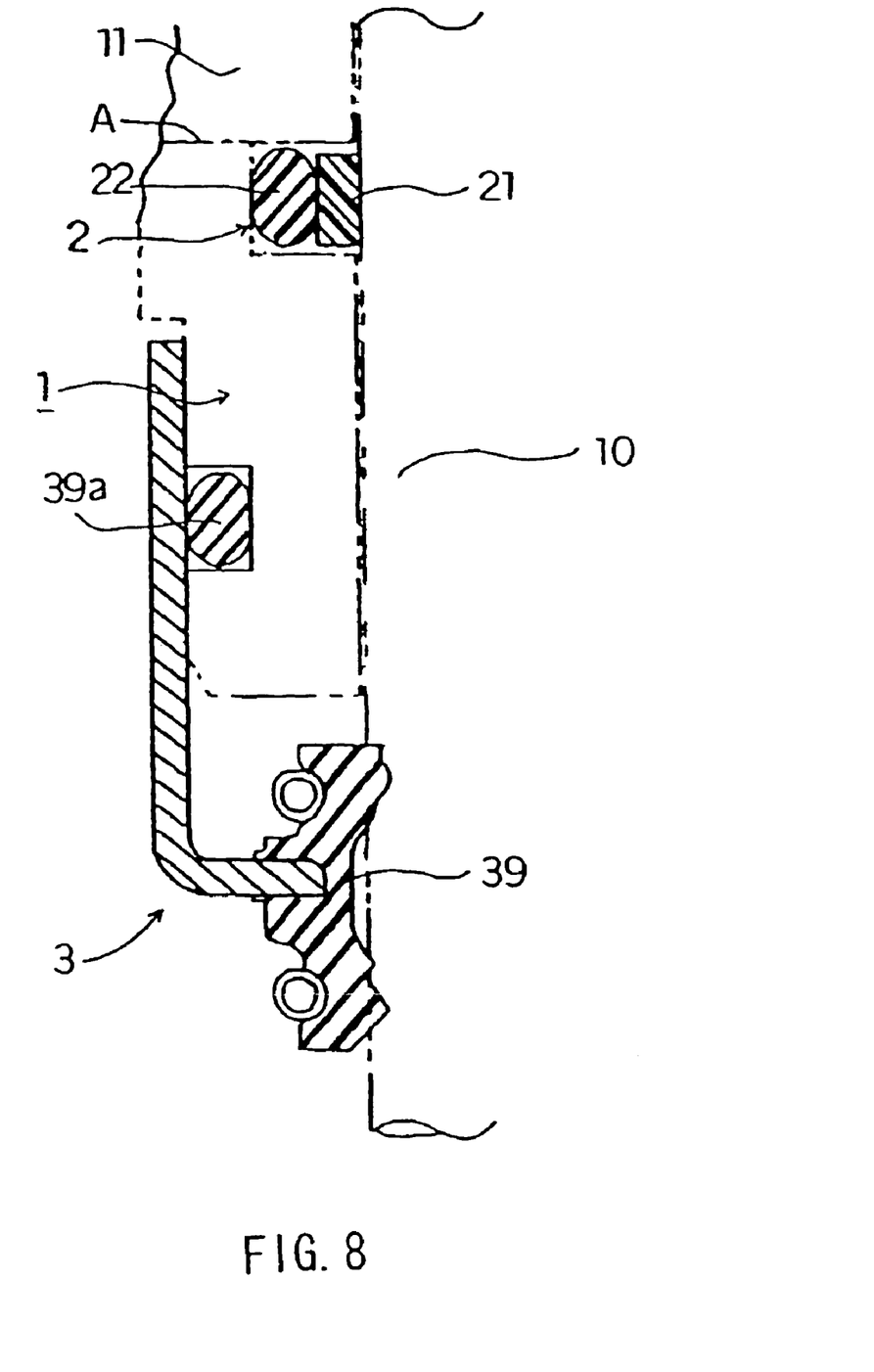
FIG. 8 is a drawing showing the sealing device according to the sixth embodiment.

FIG. 8 is a half cross-sectional view showing the sealing part 1 according to the sixth embodiment. Incidentally, since the configuration, material, and the like are the same as those in the third embodiment, description will not be made.

In the sealing device 1 in FIG. 8, an oil seal 39 is employed as a sealing member having a seal lip portion for the second sealing part 3.

The oil seal 39 is constructed by attaching a rubber-like resilient body on a metallic ring by baking. Material to be used for the rubber-like resilient body is fluorinated rubber or acrylic rubber, which are superior in fuel resistance and heat resistance. Preferably, fluorinated rubber is used. The oil seal 39 is mounted using the metal ring fitted around the outer periphery of the housing 11 to achieve metal fitting for enhancing the fitting force. Here, an O-ring 39a is interposed between the metal ring of the oil seal 39 and the housing 11. It is for preventing leakage at the metal fitting portion by the O-ring 39a.

The seal lip portion of the oil seal 39 extends separately toward the high-pressure side H and the low-pressure side L, and the respective portions are pressed against the surface of the shaft 10 by the garter spring.

Since the seal lip portion of the oil seal 39 extends separately toward the high-pressure side H and the low-pressure side L, the material of the rubber-like resilient body may be well distributed to the two seal lip portions when fabricating by providing the tip of the inner periphery of the metal ring at the root on which the rubber-like resilient body is attached by baking with a plurality of recesses formed by setting down the tip portion thereof in the circumferential direction or by providing a plurality of holes in the circumferential direction so that the area passing therethrough is extended on both sides.

The seal lip portion extending toward the high-pressure side H of the oil seal 39 sufficiently seals leakage of fuel on the high-pressure side H. The seal lip portion extending toward the high-pressure side H has an arcuate shape at the tip portion of the lip that comes into contact with the surface of the shaft 10. This arcuate shape can reduce sliding resistance with respect to the surface of the shaft 10, so that abrasion can be prevented even when sliding especially with fuel. In addition, leakage of oil supplied from the low-pressure side L via the surface of the shaft 10 due to failure of scraping is prevented.

In addition, the seal lip portion extending toward the low-pressure side L of the oil seal 39 seals leakage of oil on the low-pressure side L.

In the construction described above as well, the same effects as in the first embodiment are achieved. Moreover, since the oil seal 39 having the seal lip portion for the second sealing part 3 is used, sealing property of the device is further improved.

Incidentally, in this embodiment as well, the mounting groove for accommodating the first sealing part 2 fitted therein can be divided at the portion indicated by the line A as in the case of the third embodiment. Moreover, the distance between the positions where the first sealing part 2 and the second sealing part 3 are disposed is set longer than the reciprocating stroke of the shaft 10. The effect thereof is as described in conjunction with the third embodiment.

Industrial Applicability

As described above, according to the present invention, since the first sealing part and the second sealing part disposed on the side of the first sealing part opposite from the portion to be sealed are provided, a dual-sealing structure in which slight leakage due to failure of scraping at the first sealing part is sealed by the second sealing part is realized. Therefore, it can be used at the working pressure of 0-2 MPa, and moreover, it is prevented from breaking even when being subjected to the pressure of the high-pressure fuel at 5 MPa or higher.

Also, since the resin sealing member, which comes into slidable sealing contact with the one of the opposed surfaces, is used in the first sealing part, even when fuel having less lubricity is used, abnormal abrasion is prevented and thus durability of the seal is improved.

In addition, even when fuel containing alcohol is used, swelling hardly occurs at the first sealing part since the sealing member used is made of resin, and the urging member is prevented from breaking since there is no thinner portion unlike in the sealing device in the conventional art and, furthermore, leakage due to decrease of tightening margin hardly occurs.

Furthermore, the first and the second sealing part are simple in construction, and thus may be downsized and designed for space-saving in comparison with the construction of the sealing device having the seal lip as in the conventional art.

Then, since it can be used even when the working pressure of the high-pressure fuel is as high as 0-2 MPa, the drain port can be eliminated and thus simplification of the pump construction is achieved.

Also, since the seal retaining member forming a side wall of a groove on the side of the mounting groove for accommodating the first sealing part fitted therein is provided opposite from the side to be sealed, and the seal retaining member is formed with a second mounting groove for accommodating the second sealing part, a seal of dual-sealing construction is formed with a simple construction.

Since the second sealing part is a squeeze packing, improvement of sealing property is achieved.

Since the second sealing part includes the resin sealing member which comes into slidable sealing contact with one of the opposed surfaces and the urging member for urging the resin sealing member toward the one of the opposed surfaces, usage of the device under higher pressure is realized.

Since the second sealing part is the packing having the back-pressure leaking capability, even when the pressure is accumulated between the first sealing part and the second sealing part, the accumulated pressure can be released through the packing having the back-pressure leaking capability of the second sealing part, thereby the durability can be improved.

Since the second sealing part is the sealing member having the seal lip portion which comes into slidable sealing contact with the one of the opposed surfaces, the sealing property of the device can further be improved.

The invention claimed is:

1. A high pressure fuel pump for pressurizing fuel to a high pressure in an engine of an in-cylinder direct injection system, the fuel pump comprising a reciprocating shaft, a housing with an aperture, through which the shaft reciprocates, and a sealing device for sealing an annular gap formed between the reciprocating shaft and the housing, the sealing device comprising
    a first sealing part including a resin sealing member in slidable sealing contact with a surface of the shaft, and an O-ring urging member for urging the resin sealing member toward the surface of the shaft, the first sealing part sealing a side to be sealed where fuel exists,
    the resin sealing member being from a tetrafluoroethylene group, the O-ring urging member being one of fluorinated rubber and acrylic rubber,
    a second sealing part including a squeeze packing and a U-shaped seal retainer,
    said second sealing part being disposed on a side of the first sealing part opposite to the side to be sealed for sealing fuel depressurized at the first sealing part and lubrication oil which exists on the opposite side of where fuel exists, said squeeze packing being in slidable sealing contact with the surface of the shaft,
    said U-shaped seal retainer engaging the housing and being located between the housing and the shaft and extending towards the shaft, said U-shaped seal retainer forming a first mounting groove in conjunction with the housing, said first mounting groove receiving said first sealing part fitted therein, said U-shaped seal retainer forming a second mounting groove, said second mounting groove receiving said squeeze packing therein, and
    said squeeze packing being an X-ring, a distance between two lips of the X-ring coming into contact with the shaft being shorter than a reciprocating stroke of the shaft, the X-ring being one of fluorinated rubber and acrylic rubber,
    an axial distance between the first sealing part and the squeeze packing being longer than a reciprocating stroke of the shaft to prevent the fuel sealed by the first sealing part from entering the squeeze packing,
    said first sealing part and said second sealing part being located in a single cavity of the housing.

2. The fuel pump according to claim 1, wherein a contact surface of the resin sealing member with the shaft is a tapered surface towards a side of the squeeze packing with an axial center of the tapered surface projecting towards the shaft.

3. The fuel pump according to claim 1, wherein a contact surface of the resin sealing member with the shaft is a tapered surface towards a side to be sealed where fuel exists so that the tapered surface deviates from the shaft as the tapered surface gets close to the side to be sealed where fuel exists.

4. The fuel pump according to claim 1, wherein a working pressure of the fuel pump is 2 MPa or higher.

5. The fuel pump according to claim 1, wherein a working pressure of the fuel pump is 5 MPa or higher.

* * * * *